United States Patent [19]

Kato et al.

[11] Patent Number: 5,348,997
[45] Date of Patent: Sep. 20, 1994

[54] CROSSLINKING AQUEOUS PIGMENT DISPERSION

[75] Inventors: Yoshinori Kato; Ryutaro Hayashi; Takeo Tsukamoto; Masahiro Aoki, all of Mie, Japan

[73] Assignee: Mitsubishi Yuka Badische Co., Ltd., Yokkaichi, Japan

[21] Appl. No.: 51,180

[22] Filed: Apr. 22, 1993

[30] Foreign Application Priority Data

Apr. 24, 1992 [JP] Japan .................. 4-129861

[51] Int. Cl.$^5$ .............................................. C08K 5/24
[52] U.S. Cl. ................... 524/189; 524/555; 524/556; 524/560
[58] Field of Search ............... 524/354, 189, 555, 556, 524/560

[56] References Cited

U.S. PATENT DOCUMENTS

| | | |
|---|---|---|
| 4,210,565 | 7/1980 | Emmons . |
| 4,250,070 | 2/1981 | Ley et al. . |
| 4,267,091 | 5/1981 | Geelhaar et al. ............. 524/185 |
| 4,959,428 | 9/1990 | Abe et al. . |
| 5,208,282 | 5/1993 | Rehmer et al. . |

FOREIGN PATENT DOCUMENTS

| | | |
|---|---|---|
| 2193909 | 2/1974 | France . |
| 57-003850 | 1/1982 | Japan . |
| 58-96643 | 6/1983 | Japan . |
| 58-104902 | 6/1983 | Japan . |
| 62-62851 | 3/1987 | Japan . |
| 62-62852 | 3/1987 | Japan . |
| 62-62853 | 3/1987 | Japan . |
| 62-72742 | 4/1987 | Japan . |
| 63-51180 | 10/1988 | Japan . |
| 1-234416 | 9/1989 | Japan . |
| 2-18466 | 1/1990 | Japan . |
| 2-175742 | 7/1990 | Japan . |
| 3-7227 | 2/1991 | Japan . |

OTHER PUBLICATIONS

Patent Abstracts of Japan, vol. 14, No. 377, (C-748), Aug. 15, 1990, JP-A-21 38 376, May 28, 1990.
Patent Abstracts of Japan, vol. 6, No. 63, (C-99)(941), Apr. 22, 1982, JP-A-57 003 857, Jan. 9, 1982.
Patent Abstracts of Japan, vol. 15 No. 227, (C-839), Jun. 10, 1991, JP-A-30 68 669 Mar. 25, 1991.

*Primary Examiner*—Joseph L. Schofer
*Assistant Examiner*—Jeffrey T. Smith
*Attorney, Agent, or Firm*—Oblon, Spivak, McClelland, Maier & Neustadt

[57] ABSTRACT

A crosslinking aqueous pigment dispersion is disclosed, comprising (A) an aqueous resin dispersion, (B) a pigment, (C) a carbonyl-containing copolymer resin having an aldo group or a keto group, and (D) a hydrazine derivative having at least two hydrazino groups ($-NHNH_2$) per molecule, in which said carbonyl-containing copolymer resin (C) is a copolymer resin obtained by copolymerizing a monomer mixture consisting of (a) from 1 to 30% by weight of a carbonyl-containing unsaturated monomer having an aldo group or a keto group, (b) from 10 to 65% by weight of an ethylenically unsaturated carboxylic acid monomer, (c) from 5 to 89% by weight of at least one unsaturated monomer selected from the group consisting of an alkyl acrylate or alkyl methacrylate having from 1 to 10 carbon atoms in the alkyl moiety thereof, an aromatic vinyl monomer, acrylonitrile, methacrylonitrile, vinyl acetate, vinyl propionate, a vinyl halide, a vinylidene halide, butadiene, and ethylene, and (d) not more than 50% by weight of an unsaturated monomer other than the unsaturated monomers (a) to (c), and said carbonyl-containing copolymer resin (C) is present in an amount of from 0.1 to 10% by weight based on said pigment (B) and has been solubilized to a degree of at least 90% by weight by addition of an alkali and/or an organic solvent. The pigment dispersion provides a dry film excellent in gloss, water resistance, alkali resistance and weather resistance.

14 Claims, No Drawings

CROSSLINKING AQUEOUS PIGMENT DISPERSION

FIELD OF THE INVENTION

This invention relates to a crosslinking aqueous pigment dispersion. The crosslinking aqueous pigment dispersion of the present invention provides various compounds having excellent water resistance and weather resistance, such as aqueous coating compounds, sealing compounds, adhesives, pressure-sensitive adhesives, paper coatings, etc.

BACKGROUND OF THE INVENTION

When a pigment is incorporated into various aqueous resin compositions, such as aqueous resin coating compounds, a dispersing agent for a pigment is generally used. Commonly employed dispersing agents for pigments include polyelectrolytes, e.g., polyphosphates, e.g., sodium tripolyphosphate, sodium tetraphosphate, and sodium hexametaphosphate; a sodium alkylnaphthalenesulfonate-formalin condensation product; low-molecular ammonium polyacrylate; and a low-molecular ammonium styrene-maleate copolymer.

These pigments dispering agents are necessary to assist deflocculation and dispersion of the pigment, to reduce the viscosity of a pigment paste, as well as to prevent agglomeration of the pigment particles. However, where a pigment dispersing agent is added in an amount sufficient for obtaining desirable dispersibility, the dry film of the resulting pigment dispersion has reduced water resistance or weather resistance.

SUMMARY OF THE INVENTION

An object of the present invention is to provide a crosslinking aqueous pigment dispersion which exhibits satisfactory dispersibility and is capable of providing a dry coating film excellent in water resistance and smoothness (gloss).

The present invention relates to a crosslinking aqueous pigment dispersion comprising (A) an aqueous resin dispersion, (B) a pigment, (C) a carbonyl-containing copolymer resin having an aldo group or a keto group, and (D) a hydrazine derivative having at least two hydrazino groups (—NHNH$_2$) per molecule, in which the carbonyl-containing copolymer resin (C) is a copolymer resin obtained by copolymerization of a monomer mixture consisting of (a) from 1 to 30% by weight of a carbonyl-containing unsaturated monomer having an aldo group or a keto group, (b) from 10 to 65% by weight of an ethylenically unsaturated carboxylic acid monomer, (c) from 5 to 89% by weight of at least one unsaturated monomer selected from the group consisting of an alkyl acrylate or alkyl methacrylate having from 1 to 10 carbon atoms in the alkyl moiety thereof, an aromatic vinyl monomer (e.g., styrene), acrylonitrile, methacrylonitrile, vinyl acetate, vinyl propionate, a vinyl halide, a vinylidene halide, butadiene, and ethylene, and (d) not more than 50% by weight of an unsaturated monomer other than the unsaturated monomers (a) to (c), and the carbonyl-containing copolymer resin (C) is present in an amount of from 0.1 to 10% by weight based on the pigment (B) (i.e., the ratio by weight of the carbonyl-containing copolymer (C) to the pigment (B) is from 0.1/100 to 10/100) and has been solubilized to a degree of at least 90% by weight by addition of an alkali and/or an organic solvent.

DETAILED DESCRIPTION OF THE INVENTION

The term "carbonyl-containing copolymer resin having an aldo group or a keto group" (hereinafter simply referred to as a carbonyl-containing copolymer) as used herein means a copolymer resin containing a carbonyl group based on its aldo group or keto group. Similarly, the term "carbonyl-containing unsaturated monomer having an aldo group or a keto group" (hereinafter simply referred to as a carbonyl-containing unsaturated monomer) as used herein means an unsaturated monomer containing a carbonyl group based on its aldo group or keto group.

Aqueous resin dispersion (A) which can be used in the present invention includes aqueous dispersions of various synthetic resins, with copolymer resin emulsions obtained by emulsion polymerization being preferred.

A particularly preferred aqueous resin dispersion (A) is an aqueous dispersion of a copolymer resin obtained by emulsion polymerization of a monomer mixture consisting of (i) from 0.3 to 20% by weight of a carbonyl-containing unsaturated monomer having an aldo group or a keto group, (ii) not more than 10% by weight of an ethylenically unsaturated carboxylic acid monomer, (iii) from 55 to 99.7% by weight of at least one unsaturated monomer selected from the group consisting of an alkyl acrylate or alkyl methacrylate having from 1 to 10 carbon atoms in the alkyl moiety thereof, an aromatic vinyl monomer, acrylonitrile, methacrylonitrile, a saturated carboxylic acid vinyl ester, a vinyl halide, a vinylidene halide, butadiene, and ethylene, and (iv) not more than 15% by weight of an unsaturated monomer other than the unsaturated monomers (i) to (iii).

Where the above-mentioned specific emulsion copolymer is used as component (A), since a hydrazine derivative (D)-mediated crosslinking reaction takes place not only among molecules of component (C) but among molecules of component (A) and between components (A) and (C), the aqueous pigment dispersion provides a dry film having markedly improved water resistance. Aqueous dispersions of the copolymer resins of this type are known as disclosed in JP-B-58-20991 (corresponding to U.S. Pat. No. 4,267,091) (the term "JP-B" as used herein means an "examined published Japanese patent application"), JP-B-61-6861 (corresponding to U.S. Pat. No. 4,230,525), JP-A-57-3850 (the term "JP-A" as used herein means an "unexamined published Japanese patent application"), and JP-A-58-96643.

Besides those obtained by emulsion polymerization, useful as component (A) are polyurethane resin emulsions, alkyd resin emulsions, and bisphenol type epoxy resin emulsions.

Pigment (B) may be either an organic pigment or an inorganic pigment, or may be a mixture thereof, and may be either extender pigments or color pigments, or may be a mixture thereof. Specific examples of suitable pigments include inorganic extender pigments, e.g., calcium carbonate, clay, talc, mica, barytes, silica fine powder, diatomaceous earth, calcium silicate, aluminum silicate, barium carbonate, and magnesium carbonate; inorganic color pigments, e.g., titanium oxide, zinc oxide, lithopone, carbon black, black iron oxide, yellow ocher, yellow iron oxide, titanium yellow, red oxide, purple oxide, ultramarine, and chromium oxide; and organic color pigments, e.g., Hansa Yellow, Permanent Yellow, Permanent Red, Phthalocyanine Blue, and Phthalocyanine Green.

These pigments may be added directly to aqueous resin dispersion (A) but is usually added in the form of a pigment paste. In the preparation of a pigment paste, an aqueous solution of the carbonyl-containing copolymer resin (C) hereinafter described may be used as a dispersing medium. Other dispersing agents for pigments or thickeners may also be used as a dispersing medium.

Carbonyl-containing copolymer resin (C) is a specific copolymer resin which is obtained by copolymerization of a monomer mixture consisting of (a) from 1 to 30% by weight of a carbonyl-containing unsaturated monomer, (b) from 10 to 65% by weight of an ethylenically unsaturated carboxylic acid monomer, (c) from 5 to 89% by weight of at least one unsaturated monomer selected from the group consisting of an alkyl acrylate or alkyl methacrylate having from 1 to 10 carbon atoms in the alkyl moiety thereof, an aromatic vinyl monomer (e.g., styrene), acrylonitrile, methacrylonitrile, vinyl acetate, vinyl propionate, a vinyl halide, a vinylidene halide, butadiene, and ethylene, and (d) not more than 50% by weight of an unsaturated monomer other than the unsaturated monomers (a) to (c).

The process for preparing carbonyl-containing copolymer resin (C) by copolymerization of the unsaturated monomer mixture of (a) to (d) will hereinafter be described, with some references to the preparation of aqueous resin dispersion (A) by emulsion polymerization of monomers (i) to (iv).

Carbonyl-containing unsaturated monomer (a) includes acrolein, diacetone acrylamide, formylstyrol, a vinyl alkyl ketone having from 4 to 7 carbon atoms (e.g., vinyl methyl ketone, vinyl ethyl ketone or vinyl butyl ketone), diacetone acrylate, acetonyl acrylate, diacetone methacrylate, 2-hydroxypropyl acrylate acetylacetate, butanediol-1,4-acrylate acetylacetate and a (meth)acryloxyalkylpropenal represented by formula:

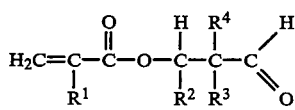

wherein $R^1$ represents a hydrogen atom or a methyl group; $R^2$ represents a hydrogen atom or an alkyl group having from 1 to 3 carbon atoms; $R^3$ represents an alkyl group having from 1 to 3 carbon atoms; and $R^4$ represents an alkyl group having from 1 to 4 carbon atoms. Preferred of them are diacetone acrylamide and acrolein. These monomers may be used either individually or in combination of two or more thereof.

Carbonyl-containing unsaturated monomer (a) is used in an amount of from 1 to 30% by weight, preferably from 5 to 15% by weight, based on the total monomers (a) to (d). If the proportion of monomer (a) is less than 1% by weight, the resulting copolymer resin has too small an aldo or keto group content. As a result, the density of the crosslinked structure achieved by the reaction with hydrazine derivative (D) is reduced, and the hardened coating film of the resulting aqueous pigment dispersion has deteriorated water resistance. If the proportion of monomer (a) exceeds 30% by weight, the resulting copolymer resin has an insufficient content of monomer (b), which not only makes solubilization by alkali addition insufficient but reduces affinity to pigment (B), resulting in poor pigment dispersion.

Carbonyl-containing unsaturated monomer (i) which is used for preparing aqueous resin dispersion (A) is similar to those described above as monomer (a).

Ethylenically unsaturated carboxylic acid monomer (b) which is used for preparing carbonyl-containing copolymer resin (C) may be either a monocarboxylic acid or a polycarboxylic acid but preferably includes mono-olefinic unsaturated carboxylic acids having from 3 to 5 carbon atoms, and particularly acrylic acid, methacrylic acid, and itaconic acid. Monomer (b) is used in an amount of from 10 to 65% by weight, preferably from 20 to 50% by weight, based on the total monomers (a) to (d). If the monomer (b) content is less than 10% by weight, the finally obtained aqueous pigment dispersion deteriorates dispersibility of pigment and storage stability. If it exceeds 65% by weight, the content of monomer (a) becomes relatively small, making the hardened coating film of the resulting aqueous pigment dispersion less water-resistant and deteriorating affinity to pigment (B).

Ethylenically unsaturated carboxylic acid (ii) which is used for preparing aqueous resin dispersion (A) is similar to those described above as monomer (b).

Unsaturated monomer (c) selected from the above-mentioned specific group of monomers is used in an amount of from 5 to 89% by weight, preferably from 30 to 70% by weight, based on the total monomers (a) to (d). If the proportion of monomer (c) is less than 5% by weight, the hardened coating film of the resulting aqueous pigment dispersion has reduced water resistance. While not necessarily clear, the reason for the reduction of water resistance seems to be because affinity of the resulting copolymer resin to aqueous resin dispersion (A) or pigment (B) would be reduced. If the proportion of monomer (c) exceeds 89% by weight, which leads to a decrease of the content of monomer (a) or (b), the pigment dispersibility and the water resistance of the hardened coating film are reduced.

Unsaturated monomer (d), selected from unsaturated monomers other than (a) to (c), is not essential and used in an amount of up to 50% by weight based on the total monomers (a) to (d). Specific examples of monomer (d) are mono-olefinic unsaturated carboxylic acid amides (e.g., acrylamide, methacrylamide, and itaconic acid amide), N-alkyl and/or N-alkylol derivatives of mono-olefinic unsaturated carboxylic acid amides (e.g., N-methylacrylamide, N-isobutylacrylamide, N-methylolacrylamide, N-methylolmethacrylamide, and N-butoxymethylacrylamide), and mono-olefinic unsaturated sulfonic acids (e.g., vinylsulfonic acid and methylacrylamidepropanesulfonic acid). These monomers (d) may be used either individually or in combination of two or more thereof.

Unsaturated monomer (iv) which is used for preparing aqueous resin dispersion (A) is appropriately selected from those similar to monomers (d).

Carbonyl-containing copolymer resin (C) is usually prepared by solution polymerization or emulsion polymerization of monomers (a) to (d), while the carbonyl-containing copolymer resin as aqueous resin dispersion (A) is usually prepared by emulsion polymerization of monomers (i) to (iv).

While not limiting, solvents to be used in solution polymerization of monomers (a) to (d) are preferably selected from water-soluble or hydrophilic solvents from the standpoint of miscibility with the resulting copolymer resin and the medium of the pigment dispersion, i.e., water. Examples of suitable solvents include monohydric alcohols having from 1 to 4 carbon atoms (e.g., methyl alcohol, ethyl alcohol, isopropyl alcohol, n-butyl alcohol, isobutyl alcohol, and t-butyl alcohol), ethylene glycol and its derivatives (e.g., ethylene glycol monomethyl ether, ethylene glycol monoethyl ether, ethylene glycol monopropyl ether, and ethylene glycol monobutyl ether), diethylene glycol and its derivatives (e.g., diethylene glycol monomethyl ether, diethylene glycol monoethyl ether, diethylene glycol monopropyl ether, and diethylene glycol monobutyl ether), 1,4-dioxane, and water. These solvents may be used either individually or in combination of two or more thereof. In general, a solvent having a boiling point of 200° C. or lower is preferred from the viewpoint of efficiency in distillation or drying after polymerization.

Examples of suitable polymerization initiators to be used in solution polymerization include azo compounds, e.g., azobisisobutyronitrile and azobisvaleronitrile; organic peroxides, e.g., benzoyl peroxide, lauroyl peroxide, and t-butyl peroxide; and inorganic peroxides, e.g., hydrogen peroxide and ammonium persulfate. These initiators may be used either individually or in combination of two or more thereof. The initiator may be used as a redox initiator in combination with a reducing agent, such as Rongalit (dihydrate of sodium formaldehyde sulfoxylate), L-ascorbic acid or an organic amine.

Emulsion polymerization for preparing carbonyl-containing copolymer resin (C) can be carried out by using a water-soluble polymerization initiator in combination with an emulsifying agent or by soap-free polymerization. The emulsifying agents include various anionic, cationic or nonionic emulsifying agents and high-molecular emulsifying agents. In particular, carbonyl-containing high-molecular emulsifying agents as disclosed in JP-A-64-48801 (corresponding to U.S. Pat. No. 4,959,428) are preferred.

Polymerization initiators which can be used in emulsion polymerization preferably include inorganic peroxides, such as potassium persulfate, ammonium persulfate, and hydrogen peroxide. These inorganic peroxides may be used in the form of a redox initiator in combination with the above-mentioned reducing agent.

In carrying out emulsion polymerization, monomers may be fed in various modes, including all-at-once addition, monomer addition, and emulsion addition. Seed polymerization, in which the composition of the monomer mixture to be fed is varied with time, or power feed polymerization may also be adopted. By using these methods (seed polymerization and power feed polymerization), the copolymer composition in the copolymer resin particles produced can be varied between the central portion and the peripheral portion so that the degree of solubilization may be controlled.

A chain transfer agent is preferably used in emulsion polymerization. In general, since a copolymer resin obtained by emulsion polymerization has a high molecular weight, it is difficult to be sufficiently water-solubilized by addition of an alkali and/or an organic solvent. Use of a chain transfer agent makes it possible to reduce the molecular weight of the copolymer resin produced, thus facilitating the solubilization with an alkali and/or an organic solvent. Examples of suitable chain transfer agents include various mercaptan compounds, α-methylstyrene, alkyl halides, and alcohols. The chain transfer agent is usually added in an amount of from 0.03 to 5% by weight based on the total monomers.

The above-mentioned polymerization conditions also apply to the emulsion polymerization of monomers (i) to (iv) for the preparation of aqueous resin dispersion (A) with, if necessary, some modifications.

Hydrazine derivative (D) containing at least two hydrazino groups per molecule includes dicarboxylic acid dihydrazides having from 2 to 10, and preferably from 4 to 6, carbon atoms (e.g., oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, and itaconic acid dihydrazide) and water-soluble aliphatic dihydrazines having from 2 to 4 carbon atoms (e.g., ethylene-1,2-dihydrazine, propylene-1,3-dihydrazine, and butylene-1,4-dihydrazine). Particularly preferred examples include adipic acid dihydrazide and sebacic acid dihydrazide.

Also included in hydrazine derivative (D) are polymers represented by formula:

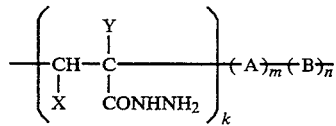

wherein X represents a hydrogen atom or a carboxyl group; Y represents a hydrogen atom or a methyl group; A represents a unit derived from acrylamide, methacrylamide, an acrylic ester, a methacrylic ester or maleic anhydride; B represents a unit derived from a monomer copolymerizable with the monomer of unit A; and k, m, and n each represents a number satisfying formulae:

$$2 \text{ mol } \% \leqq k \leqq 100 \text{ mol } \%$$

$$0 \text{ mol } \% \leqq (m+n) \leqq 98 \text{ mol } \%$$

$$(k+m+n) = 100 \text{ mol } \%$$

The details of these polymers are described, e.g., in JP-A-55-6535 (corresponding to U.S. Pat. No. 4,230,525).

The crosslinking aqueous pigment dispersion according to the present invention comprises the above-described components (A) to (D). It is especially essential that carbonyl-containing copolymer resin (C) should be present in an amount of from 0.1 to 10% by weight, preferably from 0.5 to 5% by weight, based on pigment (B). If the component (C) to component (B) ratio is lower than the above range, the pigment dispersibility is insufficient, which results in an excessive increase of the viscosity of the pigment paste in the preparation of the pigment dispersion, deterioration of storage stability of the aqueous pigment dispersion, and deterioration of gloss of the coating film. If the component (C) to component (B) ratio exceeds the above range, the water resistance of the hardened coating film is generally reduced. The pigment concentration in the aqueous pigment dispersion of the present invention (hereinafter referred to as PWC) ranges from 1 to 97% by weight. The term "PWC" as used herein means a weight percentage of the total pigment based on the total solids content of the dispersion.

The proportion of hydrazine derivative (D) in the aqueous pigment dispersion is preferably such that the molar ratio of the total carbonyl groups (>C=O) based on aldo or keto group of the resin of aqueous resin dispersion (A) and the carbonyl-containing copolymer resin (C) to the hydrazino groups in hydrazine derivative (D), i.e., (>C=O/(-NHNH$_2$) molar ratio, falls within a range of from 0.2 to 5.0. If the carbonyl to hydrazino molar ratio is greater than 5.0, i.e., if the amount of hydrazine derivative (D) is relatively small, crosslinking among polymers is insufficient in order for the aqueous pigment dispersion to provide a hardened coating film with sufficient water resistance and oil resistance. Even if a relatively large amount of hydrazine derivative (D) is used i.e., a lower carbonyl to hydrazino molar ratio, no further improvement in water resistance or oil resistance results, and besides the hardened coating film becomes inferior-transparent and brittle.

In the crosslinking aqueous pigment dispersion of the present invention, carbonyl-containing copolymer resin (C) must have been solubilized to a degree of 90% by weight or more by addition of an alkali and/or an organic solvent. Solubilization, i.e., addition of an alkali and/or an organic solvent, may be conducted before the commencement of copolymerization for the preparation of carbonyl-containing copolymer resin (C), during that copolymerization, or before, simultaneously with, or after mixing of carbonyl-containing copolymer resin (C) and aqueous resin dispersion (A) and/or hydrazine derivative (D). In any case, the terminology "degree of solubilization" as used herein means a degree of polymerization of carbonyl-containing copolymer resin (C) as determined as follows.

A resin composition containing none of components (A), (B), and (D) is prepared under quite the same conditions as actually used for preparing an aqueous pigment dispersion of the present invention, except for mixing none of components (A), (B), and (D). The resulting resin composition is diluted with water so as to have a nonvolatile content of 15% by weight. The nonvolatile content ($W_1$) of the resulting diluted resin composition is measured. The diluted resin composition is centrifuged at $1.8 \times 10^5$ g (acceleration of gravity) for 60 minutes, and the nonvolatile content ($W_2$) in the supernatant liquid is measured. The degree of solubilization (wt %) is calculated from equation:

Degree of Solubilization = $W_2/W_1 \times 100$ (wt %)

Accordingly, where an alkali and/or an organic solvent is added before or during emulsion polymerization for obtaining carbonyl-containing copolymer resin (C), and the copolymer resin as produced has a degree of solubilization of 90% by weight or more, the resulting copolymer resin as obtained only have to be mixed with aqueous resin dispersion (A) and hydrazine derivative (D) to obtain the aqueous pigment dispersion of the present invention without any positive addition of an alkali and/or an organic solvent for solubilization.

Alkalis which can be used for solubilization include inorganic water-soluble alkalis, e.g., sodium hydroxide and potassium hydroxide; inorganic salts capable of providing an alkaline aqueous solution, e.g., sodium hydrogencarbonate and sodium pyrophosphate; aqueous ammonia; and organic amines. As previously stated, addition of an alkali does not always need to be done after production of the copolymer. In other words, in some cases, before copolymerization, ethylenically unsaturated carboxylic acid (b), one of the monomers of carbonyl-containing copolymer resin (C), may be neutralized by addition of an alkali. In the case of solution polymerization, alkali addition may be effected in the presence of the solvent used for the copolymerization, or an alkali in the form of an aqueous solution may be added to the copolymer resin after removing the solvent by distillation so that the copolymer resin is partially or completely water-solubilized. The amount of the alkali to be used may be such for either complete or partial neutralization of the carboxyl groups in the copolymer resin.

An organic solvent may be supplementarily used where alkali addition is insufficient for desired water solubilization, or solubilization as desired may be effected only by addition of an organic solvent. In the case where carbonyl-containing copolymer resin (C) is prepared by solution polymerization, and the organic solvent used as a polymerization solvent may also serve as an organic solvent for solubilization, positive addition of an organic solvent may not be necessary in some cases, or, in other cases, an organic solvent different from that used as a polymerization solvent may be added. Organic solvents to be used for solubilization include those described above as a solvent for solution polymerization. Particularly preferred organic solvents for solubilization are ethylene glycol monobutyl ether, ethylene glycol monoethyl ether and their acetate, benzyl alcohol, butyl carbitol acetate, 2,2,4-trimethyl-1,3-pentanediol and 2,2,4-trimethylpentandiol-1,3-monoisobutyrate ("Texanol" available from Eastman Kodak Company).

The crosslinking aqueous pigment dispersion according to the present invention exhibits satisfactory dispersibility of pigment and provides a dry film excellent in water resistance and smoothness and is therefore useful as an aqueous coating compound, a sealing compound, an adhesive, a pressure-sensitive adhesive, a paper coating, or an intermediate material for preparing these pigment compounds. According to the end use, the pigment dispersion may further contain low-boiling ketones or aldehydes, such as acetone, methyl ethyl ketone, and glyoxal, for adjustment of a crosslinking reaction.

The present invention will now be illustrated in greater detail with reference to Preparation Examples, Examples, and Comparative Examples. All the parts and percents are given by weight unless otherwise indicated.

PREPARATION EXAMPLE 1

In a reactor equipped with a temperature controller, an anchor stirrer, a reflux condenser, a feeder, a thermometer, and an inlet for nitrogen, purged with nitrogen, 100 parts of isopropyl alcohol was charged. The temperature was raised to 80° C., and a mixture of the following composition was slowly added thereto through the feeder over a period of 2 hours. After completion of the addition, the mixture was kept at 80° C. for an additional period of 2 hours to complete a reaction.

| Mixture: | |
| --- | --- |
| Isopropyl alcohol | 100 parts |
| Methyl acrylate | 45 parts |
| Butyl acrylate | 10 parts |

-continued

| Mixture: | |
|---|---|
| Acrylic acid | 35 parts |
| Diacetone acrylamide | 10 parts |
| Azobisisobutyronitrile | 4 parts |

After completion of the reaction, 198 parts of a 10% sodium hydroxide aqueous solution and 350 parts of water were added to the reaction mixture, and the mixture was distilled under reduced pressure to remove 500 parts of an isopropyl alcohol/water mixture to obtain 350 parts of a clear aqueous solution of a carbonyl-containing copolymer resin having a nonvolatile content of 32% and a pH of 8.5. The resulting copolymer resin solution was designated solution A. In Table 1 are shown the composition of monomers used in the copolymerization and the nonvolatile content of solution A.

PREPARATION EXAMPLE 2

An emulsifying agent aqueous solution having the following composition was charged in the same reactor as used in Preparation Example 1.

| Emulsifying Agent Aqueous Solution: | |
|---|---|
| Sodium salt of a sulfuric acid half-ester of an ethylene oxide (20 mol) adduct of p-nonyl phenol (hereinafter referred to as anionic emulsifying agent A) (35% aqueous solution) | 3 parts |
| Ethylene oxide (25 mol) adduct of p-nonyl phenol (hereinafter referred to as nonionic emulsifying agent B) (20% aqueous solution) | 5 parts |
| Water | 50 parts |

After purging the reactor with nitrogen, 10% of Mixture I having the following composition was added thereto. Ten percents of Mixture II having the following composition was fed thereto while heating the contents of the reactor at 90° C. Then, the rest of Mixture I and the rest of Mixture II were simultaneously and slowly fed to the reactor over a period of from 3 to 3.5 hours to conduct a reaction. After the addition, the reaction mixture was maintained at 90° C. for an additional period of 1.5 hours to complete emulsion polymerization. After cooling, the reaction mixture was adjusted to a pH of 8.5 with a 10% sodium hydroxide aqueous solution and diluted with water so as to have a solids content of 20% to prepare a substantially clear carbonyl-containing copolymer resin solution (designated solution B).

| Mixture I: | |
|---|---|
| Ethyl acrylate | 65 parts |
| Styrene | 5 parts |
| Methacrylic acid | 20 parts |
| Acrolein | 5 parts |
| Acrylamide | 5 parts |
| Mercaptopropionic acid | 0.2 parts |
| 35% Aq. solution of anionic emulsifying agent A | 5 parts |
| 20% Aq. solution of nonionic emulsifying agent B | 5 parts |
| Water | 50 parts |
| Mixture II: | |
| Potassium persulfate | 0.5 part |
| Water | 16 parts |

PREPARATION EXAMPLES 3 TO 6

Carbonyl-containing copolymer resin solutions (designated solutions C to F) were prepared in the same manner as for solution A of Preparation Example 1, except for changing the monomer composition as shown in Table 1 below. The nonvolatile content of solutions C to F is also shown in Table 1.

TABLE 1

| | Prepn. Example 1 (Solution A) | Prepn. Example 2 (Solution B) | Prepn. Example 3 (Solution C) | Prepn. Example 4 (Solution D) | Prepn. Example 5 (Solution E) | Prepn. Example 6 (Solution F) |
|---|---|---|---|---|---|---|
| Monomer Mixture (part): | | | | | | |
| Methyl acrylate | 45 | — | — | 60 | 65 | — |
| Ethyl acrylate | — | 65 | — | — | — | 4 |
| Butyl acrylate | 10 | — | — | — | 20 | — |
| Methyl methacrylate | — | — | 18 | — | — | — |
| Styrene | — | 5 | — | — | — | — |
| Acrolein | — | 5 | — | — | — | — |
| Diacetone acrylamide | 10 | — | 17 | — | 10 | 5 |
| Acrylic acid | 35 | 20 | 25 | 40 | 5 | 91 |
| Methacrylic acid | — | — | 40 | — | — | — |
| Acrylamide | — | 5 | — | — | — | — |
| Mercaptopropionic acid | — | 0.2 | — | — | — | — |
| Nonvolatile content in copolymer resin solution produced (%) | 32 | 20 | 32 | 32 | 32 | 32 |
| Remark | Invention | Invention | Invention | Comparison | Comparison | Comparison |

PREPARATION EXAMPLE 7

In a reactor equipped with a temperature controller, an anchor stirrer, a reflux condenser, a feeder, a thermometer, and an inlet for nitrogen was charged an emulsifying agent aqueous solution having the following composition.

| Emulsifying Agent Aqueous Solution: | |
|---|---|
| Water | 200 parts |
| 35% Aq. solution of anionic emulsifying agent A | 5 parts |
| 20% Aq. solution of nonionic emulsifying agent B | 20 parts |

After purging the reactor with nitrogen, 10% of Mixture III shown below was added thereto, followed by heating to 90° C. While keeping the contents at 90° C., the rest of Mixture III and Mixture IV shown below were simultaneously and slowly added thereto over a period of 1.5 hours to conduct emulsion polymerization.

| Mixture III: | |
|---|---|
| Water | 200 parts |
| 35% Aq. solution of anionic emulsifying agent A | 25 parts |
| Acrylic acid | 5 parts |
| Diacetone acrylamide | 14 parts |
| Butyl acrylate | 205 parts |
| Styrene | 242 parts |
| Mixture IV: | |
| Potassium persulfate | 2.5 parts |
| Water | 85 parts |

After completion of the polymerization reaction, aqueous ammonia (28%) was added to the reaction mixture to adjust to a pH of 8 to obtain an aqueous resin dispersion. The resulting aqueous resin dispersion was designated dispersion a. The minimum film-forming temperature of the copolymer resin was 25° C. In Table 2 are shown the monomer composition used in the co-polymerization and the nonvolatile content of dispersion a.

PREPARATION EXAMPLES 8 AND 9

An aqueous resin dispersion (designated dispersion b or c) was prepared in the same manner as for dispersion a of Preparation Example 7, except for changing the monomer composition of Mixture III as shown in Table 2 below. The nonvolatile content of the resin dispersion prepared is also shown in Table 2.

TABLE 2

| | Prepn. Example 7 (Dispersion a) | Prepn. Example 8 (Dispersion b) | Prepn. Example 9 (Dispersion c) |
|---|---|---|---|
| Monomer Mixture (part): | | | |
| Butyl acrylate | 205 | 190 | — |
| 2-Ethylhexyl acrylate | — | — | 221 |
| Methyl methacrylate | — | — | 240 |
| Styrene | 242 | 229 | — |
| Diacetone acrylamide | 14 | 40 | — |
| Acrylic acid | 5 | 7 | 5 |
| Nonvolatile content of resin dispersion (%) | 48 | 48 | 48 |

EXAMPLE 1

A pigment paste was prepared by mixing 3.1 parts of solution A prepared in Preparation Example 1, 50 parts of water, 0.2 part of aqueous ammonia (28%), 2 parts of a defoaming agent "SN Defoamer 315" (produced by San Nopco Co., Ltd.), 10 parts of a 2% hydroxyethyl cellulose aqueous solution, 100 parts of titanium oxide, and 100 parts of precipitated barium carbonate in a disper.

The pigment paste was mixed with 210 parts of dispersion a obtained in Preparation Example 7, 5 parts of a 20% aqueous solution of adipic acid dihydrazide, 7.5 parts of Texanol, and 7.5 parts of benzyl alcohol to prepare a coating compound. The coating compound had a PWC of 66% as calculated from equation:

$$PWC (\%) = (\text{Total pigment weight})/(\text{Total solids content in the coating compound}) \times 100$$

EXAMPLE 2 TO 5 AND COMPARATIVE EXAMPLES 1 AND 3-6

A coating compound was prepared in the same manner as in Example 1, except for using the composition shown in Table 3 below.

EXAMPLE 6

A pigment paste was prepared by mixing 1 part of solution B obtained in Preparation Example 2, 21 parts of water, 0.1 part of aqueous ammonia (28%), 15 parts of black iron oxide, and 4 parts of titanium oxide in a disper.

The pigment paste was mixed with 400 parts of dispersion c obtained in Preparation Example 9, 11 parts of a 20% aqueous solution of adipic acid dihydrazide, 14 parts of Texanol, 14 parts of benzyl alcohol, and 2 parts of a defoaming agent "SN Defoamer 315" to prepare a coating compound having a PWC of 9%.

The composition and other characteristics of the coating compounds prepared in Examples 1 to 6 and Comparative Examples 1 and 3 to 6 are shown in Table 3 below.

TABLE 3

| | Example 1 | Example 2 | Example 3 | Example 4 | Example 5 | Compar. Example 1 |
|---|---|---|---|---|---|---|
| Composition (part): | | | | | | |
| (C) Copolymer resin solution | A | A | A | C | B | D |
| | 3.1 | 9.3 | 43.4 | 25 | 5.0 | 3.1 |
| (Resinous content in (C)) | (1.0) | (3.0) | (13.9) | (8.0) | (1.0) | (1.0) |
| Water | 50 | 50 | 50 | 42 | 145 | 50 |
| 28% Aq. ammonia | 0.2 | 0.2 | 0.2 | 0.2 | 0.2 | 0.2 |
| 20% Sodium polyacrylate aq. solution | — | — | — | — | — | — |
| Defoaming agent* | 2 | 2 | 2 | 2 | 2 | 2 |
| 2% Hydroxyethyl cellulose aq. solution | 10 | 10 | 10 | 10 | 10 | 10 |
| (B) Titanium oxide | 100 | 100 | 100 | 100 | 100 | 100 |
| (B) Precipitated barium carbonate | 100 | 100 | 100 | 100 | 100 | 100 |
| (A) Aqueous resin dispersion | a | a | a | b | c | a |
| | 210 | 210 | 210 | 46 | 972 | 210 |
| (D) 20% Aq. solution of adipic acid dihydrazide | 5 | 6 | 12 | 5 | 1.0 | 5 |
| Coalescing agent** | 15 | 15 | 15 | 4 | 69 | 15 |

TABLE 3-continued

|  | | | | | | |
|---|---|---|---|---|---|---|
| Resin content in (C) to pigment (B) ratio (wt %) | 0.5 | 1.5 | 7.0 | 4.0 | 0.5 | 0.5 |
| Degree of solubilization of resin content in (C) (wt %) | 100 | 100 | 100 | 100 | 95 | 100 |
| PWC of coating compound (wt %) | 66 | 66 | 66 | 90 | 30 | 66 |

|  | Compar. Example 3 | Compar. Example 4 | Example 6 | Compar. Example 5 | Compar. Example 6 |
|---|---|---|---|---|---|
| Composition (part): | | | | | |
| (C) Copolymer resin solution | F | A | B | — | — |
|  | 3.1 | 3.1 | 1.0 | | |
| (Resinous content in (C)) | (1.0) | (1.0) | (0.2) | | |
| Water | 50 | 50 | 21 | 50 | 50 |
| 28% Aq. ammonia | 0.2 | 0.2 | 0.1 | 0.2 | 0.2 |
| 20% Sodium polyacrylate aq. solution | — | — | — | 15 | 70 |
| Defoaming agent* | 2 | 2 | 2 | 2 | 2 |
| 2% Hydroxyethyl cellulose aq. solution | 10 | 10 | — | 10 | 10 |
| (B) Titanium oxide | 100 | 100 | 4 | 100 | 100 |
| (B) Precipitated barium carbonate | 100 | 100 | (black iron oxide 15) | 100 | 100 |
| (A) Aqueous resin dispersion | a | a | a | a | a |
|  | 210 | 210 | 400 | 400 | 400 |
| (D) 20% Aq. solution of adipic acid dihydrazide | 5 | — | 11 | — | — |
| Coalescing agent** | 15 | 15 | 28 | 15 | 15 |
| Resin content in (C) to pigment (B) ratio (wt %) | 0.5 | 1.0 | 1.1 | — | — |
| Degree of solubilization of resin content in (C) (wt %) | 100 | 100 | 95 | — | — |
| PWC of coating compound (wt %) | 66 | 66 | 9 | 66 | 66 |

Note:
*"SN Defoamer 315" produced by San Nopco Co., Ltd.
**Mixture of Texanol and benzyl alcohol (1:1)

Each of the coating compounds obtained in Examples 1 to 6 and Comparative Examples 1 and 3 to 6 was evaluated in accordance with the following test methods. The results obtained are shown in Table 4 below.

1) Storage Stability

The coating compound was preserved at 50° C. for 1 week, and the viscosity (KU value by Stomer viscometer) was measured to examine the change in viscosity.

2) Gloss of Coating Film

The coating compound was coated on a glass plate to a wet thickness of 150 μm and dried at 65% RH for 48 hours. The 60° specular gloss of the dry film was measured.

3) Water Resistance of Coating Film

The coating compound was applied twice on a flexible plate (150×70 mm) with a brush and dried in air at 20° C. and 65% RH for 7 days to prepare a specimen. The specimen was immersed in water at 20° C. for 7 days, and the 60° specular gloss (%) of the coating film was measured. Further, occurrence of blisters on the film after water immersion was visually observed. Blisters, if any observed, were rated according to the criteria set up by Nippon Toryo Kensa Kyokai as described below.

| Criteria of Blister Occurrence: | | | | | |
|---|---|---|---|---|---|
| Blister | Size of Blisters (mm) | | | | |
| Area | 0.1≧ | 0.2–0.5 | 0.6–1.0 | 2–3 | 4≦ |
| 0.5≧ | 8VS | 8S | 8M | 8L | 8VL |
| 0.6–5 | 6VS | 6S | 6M | 6L | 6VL |
| 6–10 | 4VS | 4S | 4M | 4L | 4VL |
| 11–30 | 2VS | 2S | 2M | 2L | 2VL |
| 31≦ | 0VS | 0S | 0M | 0L | — |

Furthermore, the coating film immediately after being taken out of water was scratched by a fingernail, and peeling and the like were observed and rated as follows.

Good . . . Neither peeling from the substrate nor cohesive failure in the coating film was observed.

Medium . . . Slight peeling or cohesive failure was observed.

Bad . . . Peeling or cohesive failure occurred.

4) Alkali Resistance of Coating Film

A dry film of the coating compound was tested in the same manner as in the water resistance test (3) above, except for using a saturated lime aqueous solution in place of water.

5) Weather Resistance of Coating Film

The same specimen as prepared in the water resistance test (3) above was exposed to weathering for 3 months, and the gloss retention (%) was determined.

TABLE 4

|  | Example 1 | Example 2 | Example 3 | Example 4 | Example 5 | Compar. Example 1 |
|---|---|---|---|---|---|---|
| Solids content (wt %) | 63 | 63 | 61 | 70 | 48 | 63 |
| Viscosity (KU value) | 90 | 85 | 80 | 100 | 75 | 88 |
| Storage stability (KU value; | 95 | 85 | 80 | 101 | 75 | 94 |

TABLE 4-continued

|  | | | | | | |
|---|---|---|---|---|---|---|
| 50° C. × 7 days) Gloss (%) | 40 | 42 | 45 | — | 65 | 42 |
| Water resistance (immersion in water for 7 days): | | | | | | |
| 60° Specular gloss retention (%) | 98 | 98 | 97 | — | 95 | 80 |
| Blistering* | not observed | not observed | not observed | not observed | not observed | not observed |
| Softening | good | good | good | good | medium | medium |
| Alkali resistance (immersion in saturated lime solution for 7 days): | | | | | | |
| 60° Specular gloss retention (%) | 97 | 97 | 97 | — | 96 | 78 |
| Blistering* | not observed | not observed | not observed | not observed | not observed | not observed |
| Softness | good | good | good | good | good | medium |
| Weather resistance (exposure to weathering for 3 months): | | | | | | |
| 60° Specular gloss retention (%) | 95 | 93 | 93 | — | 97 | 85 |

|  | Compar. Example 3 | Compar. Example 4 | Example 6 | Compar. Example 5 | Compar. Example 6 |
|---|---|---|---|---|---|
| Solids content (wt %) | 63 | 63 | 44 | 62 | 60 |
| Viscosity (KU value) | 84 | 84 | 60 | 84 | 78 |
| Storage stability (KU value; 50° C. × 7 days) | 84 | 84 | 60 | 84 | 78 |
| Gloss (%) | 45 | 42 | 89 | 39 | 37 |
| Water resistance (immersion in water for 7 days): | | | | | |
| 60° Specular gloss retention (%) | 75 | 78 | 94 | 76 | 5 |
| Blistering* | 4M | 6M | not observed | not observed | 4M |
| Softening | medium | medium | good | bad | bad |
| Alkali resistance (immersion in saturated lime solution for 7 days): | | | | | |
| 60° Specular gloss retention (%) | 60 | 80 | 95 | 70 | 50 |
| Blistering* | 2M | 4M | not observed | 4M | 2M |
| Softness | bad | bad | good | bad | bad |
| Weather resistance (exposure to weathering for 3 months): | | | | | |
| 60° Specular gloss retention (%) | 75 | 84 | 96 | 70 | 63 |

Note:
See the criteria described above.

As is apparent from the results in Table 4, the coating compounds according to the present invention are superior to the comparative coating compounds in terms of gloss, water resistance, alkali resistance, and weather resistance of the dry film in good balance.

As described and demonstrated above, the crosslinking aqueous pigment dispersion of the present invention provides a hardened coating film, excellent in gloss, water resistance, alkali resistance, weather resistance and so on in good balance.

While the invention has been described in detail and with reference to specific examples thereof, it will be apparent to one skilled in the art that various changes and modifications can be made therein without departing from the spirit and scope thereof.

What is claimed is:

1. An aqueous composition containing a pigment comprising (A) an aqueous resin dispersion, (B) a pigment, (C) a carbonyl-containing copolymer resin having an aldo group or a keto group, and (D) a hydrazine derivative having at least two hydrazino groups (—NHNH$_2$) per molecule, in which said carbonyl-containing copolymer resin (C) is a copolymer resin having a degree of solubilization of less than 90% by weight obtained by copolymerization of a monomer mixture consisting of (a) from 1 to 30% by weight of a carbonyl-containing unsaturated monomer having an aldo group or a keto group, (b) from 10 to 65% by weight of an ethylenically unsaturated carboxylic acid monomer, (c) from 5 to 89% by weight of at least one unsaturated monomer selected from the group consisting of an alkyl acrylate or alkyl methacrylate having from 1 to 10 carbon atoms in the alkyl moiety thereof, an aromatic vinyl monomer, acrylonitrile, methacrylonitrile, vinyl acetate, vinyl propionate, a vinyl halide, a vinylidene halide, butadiene, and ethylene, and (d) not more than 50% by weight of an unsaturated monomer other than the unsaturated monomers (a) to (c), and said carbonyl-containing copolymer resin (C) is present in an amount of from 0.1 to 10% by weight based on said pigment (B) and has been solubilized to a degree of at least 90% by weight by addition of an alkali and/or organic solvent.

2. An aqueous composition containing a pigment as claimed in claim 1, wherein said aqueous resin dispersion (A) is an aqueous dispersion of a copolymer resin obtained by emulsion polymerization of a monomer mixture consisting of (i) from 0.3 to 20% by weight of a carbonyl-containing unsaturated monomer having an aldo group or a keto group, (ii) not more than 10% by weight of an ethylenically unsaturated carboxylic acid monomer, (iii) from 55 to 99.7% by weight of at least one unsaturated monomer selected from the group consisting of an alkyl acrylate or alkylmethacrylate having from 1 to 10 carbon atoms in the alkyl moiety thereof, an aromatic vinyl monomer, acrylonitrile, methacrylonitrile, a saturated carboxylic acid vinyl ester, a vinyl halide, a vinylidene halide, butadiene, and ethylene, and (iv) not more than 15% by weight of an unsaturated monomer other than the unsaturated monomers (i) to (iii).

3. An aqueous composition containing a pigment as claimed in claim 1, wherein said pigment concentration is from 1 to 97% by weight based on the total solids content of the composition.

4. An aqueous composition containing a as claimed in claim 1, wherein said carbonyl-containing copolymer resin (C) is a copolymer resin obtained by copolymerization of a monomer mixture consisting of (a) from 5 to 15% by weight of a carbonyl-containing unsaturated monomer having an aldo group or a keto group, (b) from 20 to 50% by weight of an ethylenically unsaturated carboxylic acid monomer, (c) from 30 to 70% by weight of at least one unsaturated monomer selected from the group consisting of an alkyl acrylate or alkyl methacrylate having from 1 to 10 carbon atoms in the alkyl moiety thereof, an aromatic vinyl monomer, acrylonitrile, methacrylonitrile, vinyl acetate, vinyl propionate, a vinyl halide, a vinylidene halide, butadiene, and ethylene, and (d) not more than 50% by weight of an unsaturated monomer other than the unsaturated monomers (a) to (c).

5. An aqueous composition containing a pigment as claimed in claim 1, wherein said carbonyl-containing copolymer resin (C) is present in an amount of from 0.5 to 5% by weight based on said pigment (B).

6. An aqueous composition containing a pigment as claimed in claim 1, wherein said carbonyl-containing unsaturated monomer (a) is diacetone acrylamide or acrolein.

7. An aqueous composition containing a pigment as claimed in anyone claim of claims 1 to 6, wherein the molar ratio of the total carbonyl groups in both the resin of said aqueous resin dispersion (A) and said carbonyl-containing copolymer resin (C) to the hydrazino groups in said hydrazine derivative (D) is from 0.2 to 5.0.

8. An aqueous composition containing a pigment as claimed in claim 3, wherein said aqueous resin dispersion (A) is selected from the group consisting of polyurethane resin emulsions, alkyd resin emulsions, and bisphenol epoxy resin emulsions.

9. An aqueous composition containing a pigment as claimed in claim 3, wherein the carbonyl-containing unsaturated monomer (a) in carbonyl-containing copolymer resin (C) is used in the amount of from 5 to 15% by weight, based on the total monomers (a) to (d).

10. An aqueous composition containing a pigment as claimed in claim 3, wherein the ethylenically unsaturated carboxylic acid monomer (b) in carbonyl-containing copolymer resin (C) is used in the amount of from 20 to 50% by weight, based on the total monomers (a) to (d).

11. An aqueous composition containing a pigment as claimed in claim 3, wherein the unsaturated monomer (c) in carbonyl-containing copolymer resin (C) is used in the amount of from 30 to 70% by weight, based on the total monomers (a) to (d).

12. An aqueous composition containing a pigment as claimed in claim 3, wherein the carbonyl-containing copolymer resin (C) has been solubilized to a degree of at least 90% by weight by addition of an alkali.

13. An aqueous composition containing a pigment as claimed in claim 10, wherein the unsaturated monomer (c) in carbonyl-containing copolymer resin (C) is used in the amount of from 30 to 70% by weight, based on the total monomers (a) to (d).

14. An aqueous composition containing a pigment as claimed in claim 11, wherein the ethylenically unsaturated carboxylic acid monomer (b) in carbonyl-containing copolymer resin (C) is used in the amount of from 20 to 50% by weight, based on the total monomers (a) to (d).

* * * * *